(12) United States Patent
Gardner et al.

(10) Patent No.: US 9,058,317 B1
(45) Date of Patent: Jun. 16, 2015

(54) SYSTEM AND METHOD FOR MACHINE LEARNING MANAGEMENT

(71) Applicant: Digital Reasoning Systems, Inc., Franklin, TN (US)

(72) Inventors: James Johnson Gardner, Austin, TX (US); Terrence Scot Clausing, Gallatin, TN (US); Phillip Daniel Michalak, Spring Hill, TN (US); Jared William Bunting, Nashville, TN (US); Keith Ellis Massey, Nashville, TN (US)

(73) Assignee: Digital Reasoning Systems, Inc., Franklin, TN (US)

( * ) Notice: Subject to any disclaimer, the term of this patent is extended or adjusted under 35 U.S.C. 154(b) by 74 days.

(21) Appl. No.: 14/444,326

(22) Filed: Jul. 28, 2014

Related U.S. Application Data (62) Division of application No. 13/666,714, filed on Nov. 1, 2012.

(51) Int. Cl.
  *G06F 17/00* (2006.01)
  *G06F 17/24* (2006.01)
  *G06N 99/00* (2010.01)

(52) U.S. Cl.
  CPC ............ *G06F 17/241* (2013.01); *G06N 99/005* (2013.01)

(58) Field of Classification Search
  None
  See application file for complete search history.

(56) References Cited

U.S. PATENT DOCUMENTS

| | | | |
|---|---|---|---|
| 7,249,117 B2 | 7/2007 | Estes | |
| 7,548,847 B2 * | 6/2009 | Acero et al. | 704/9 |
| 7,882,055 B2 | 2/2011 | Estes | |
| 8,015,143 B2 | 9/2011 | Estes | |
| 2003/0212543 A1 * | 11/2003 | Epstein et al. | 704/9 |
| 2003/0212544 A1 | 11/2003 | Acero et al. | |
| 2006/0074634 A1 * | 4/2006 | Gao et al. | 704/9 |
| 2007/0150802 A1 * | 6/2007 | Wan et al. | 715/512 |
| 2007/0244700 A1 | 10/2007 | Kahn et al. | |
| 2008/0221874 A1 * | 9/2008 | Cao et al. | 704/9 |
| 2009/0055761 A1 | 2/2009 | Basson et al. | |
| 2010/0227301 A1 | 9/2010 | Yu et al. | |
| 2010/0250497 A1 * | 9/2010 | Redlich et al. | 707/661 |

OTHER PUBLICATIONS

Office Action mailed Mar. 8, 2013 for priority U.S. Appl. No. 13/666,714.
Synthesys Technology Overview, Digital Reasoning Systems, Inc., 2011, 12 pages.
Understanding Alice: Synthesys Model Training, Aug. 2012, Digital Reasoning Systems, Inc., 12 pages.
Office Action mailed Jul. 19, 2013 for priority U.S. Appl. No. 13/666,714.

* cited by examiner

*Primary Examiner* — Keith Bloomquist
(74) *Attorney, Agent, or Firm* — Troutman Sanders LLP; Ryan A. Schneider; Christopher W. Glass (57) ABSTRACT

According to one aspect, a method for machine learning management is provided. In one embodiment, the method includes receiving a first segment of text data, identifying data features corresponding to a sequence of characters in the first segment of text data, and generating predictive annotations to the sequence of characters based at least in part on the identified data features. The method can also include identifying inaccurate annotations generated according to the predictive annotations, correcting the identified inaccurate annotations, generating one or more sets of model training data incorporating the corrected annotations, and monitoring progress of annotations made to a second segment of text data associated with the first segment of text data by a plurality of collaborating users of a plurality of managed computers.

30 Claims, 5 Drawing Sheets

SYSTEM AND METHOD FOR MACHINE LEARNING MANAGEMENT

CROSS-REFERENCE TO RELATED APPLICATION

This Application is a divisional of, and claims benefit under 35 U.S.C. §121 to, U.S. patent application Ser. No. 13/666,714 filed Nov. 1, 2012, the entire contents and substance of which is hereby incorporated by reference as if fully set forth below in its entirety.

BACKGROUND

Existing text markup editors and document tagging tools are commonly non-hosted solutions that can prove difficult for teams to use in collaborative document annotation efforts. Conventional approaches may not easily integrate with model training technologies and can lack automatic prediction for various analytic tasks. Further, current technologies are not able to track history of models or handle lexicons in tagging interfaces. It is with respect to these and other considerations that the various embodiments described below are presented.

SUMMARY

Concepts and technologies are described herein for machine learning management. According to one aspect, a computer-implemented method is presented. In one embodiment, the method includes receiving a first segment of text data, identifying data features corresponding to a sequence of characters in the first segment of text data, and generating predictive annotations to the sequence of characters based at least in part on the identified data features. The method can also include identifying inaccurate annotations generated according to the predictive annotations, correcting the identified inaccurate annotations, generating one or more sets of model training data incorporating the corrected annotations, and monitoring progress of annotations made to a second segment of text data associated with the first segment of text data by a plurality of collaborating users of a plurality of managed computers. Monitoring the progress of the annotations can include determining, based at least in part on a training descriptor corresponding to the second segment of text data, a state of completion of annotations made to the second segment of text data by a particular one of the plurality of collaborating users, where the training descriptor identifies types of annotations in the one or more sets of model training data.

According to another aspect, a system is presented. In one embodiment, the system includes a processing unit and a memory that is operatively coupled to the processing unit. The system can also include a program module that executes in the processing unit from the memory, when executed by the processing unit, causes the system to perform machine learning management functions. The machine learning management functions can include receiving a first segment of text data, identifying data features corresponding to a sequence of characters in the first segment of text data, generating predictive annotations to the sequence of characters based at least in part on the identified data features, and identifying inaccurate annotations generated according to the predictive annotations. The machine learning management functions can further include correcting the identified inaccurate annotations, generating one or more sets of model training data incorporating the corrected annotations, and monitoring progress of annotations made to a second segment of text data associated with the first segment of text data by a plurality of collaborating users of a plurality of managed computers. Monitoring the progress of the annotations can include determining, based at least in part on a training descriptor corresponding to the second segment of text data, a state of completion of annotations made to the second segment of text data by a particular one of the plurality of collaborating users, where the training descriptor identifies types of annotations in the one or more sets of model training data.

According to another aspect, a non-transitory computer-readable storage medium is presented. In one embodiment, the computer-readable storage medium stores computer-executable instructions which, when executed by a processing unit, cause a computer to perform machine learning management functions. The machine learning management functions can include receiving a first segment of text data, identifying data features corresponding to a sequence of characters in the first segment of text data, and generating predictive annotations to the sequence of characters based at least in part on the identified data features. The machine learning managements can further include identifying inaccurate annotations generated according to the predictive annotations, correcting the identified inaccurate annotations, generating one or more sets of model training data incorporating the corrected annotations, and monitoring progress of annotations made to a second segment of text data associated with the first segment of text data by a plurality of collaborating users of a plurality of managed computers. Monitoring the progress of the annotations can include determining, based at least in part on a training descriptor corresponding to the second segment of text data, a state of completion of annotations made to the second segment of text data by a particular one of the plurality of collaborating users, where the training descriptor identifies types of annotations in the one or more sets of model training data.

These and other features as well as advantages will be apparent from a reading of the following detailed description and a review of the associated drawings.

DETAILED DESCRIPTION

Concepts and technologies are described herein for machine learning management. In the following detailed description, references are made to the accompanying drawings that form a part hereof, and in which are shown by way of illustration specific embodiments or examples.

Some functions of natural language processing ("NLP") according to one or more embodiments described herein are implemented by model-based machine learning using probabilistic mathematical models (also referred to herein as "data models" or "models"). The models may encode a variety of different data "features" and associated weight information, which may be stored in a network-based file system and used to re-construct the model at run time. Each model may be used to provide one or more functionalities in an NLP engine. The features utilized by language models may be determined by users such as linguists or developers and can be fixed at model training time. The models may be re-trained at any time. The translation from raw text to parsed sentence information may be encoded as a series of models (e.g. tokenizer, part of speech ("POS") tagger, chunker, extractor/named entity recognition).

The features used by these models may be language neutral. In one or more embodiments described herein, NLP engines may use a variety of language features such that each model can learning appropriate weights for these features in order to produce the most accurate predictions possible. The models may also utilize lexicons that indicate the category type for already known entities. Used in an NLP process, the model may be used to predict the correct labeling sequences for characters and/or tokens, which can include of parts of speech, syntactic role (e.g. noun phrase, verb phrase, prepositional phrase), token boundaries, and/or categories.

According to one or more embodiments described herein, a training phase may be used to identify features that are significant for determining the correct label sequencing implemented by that model, and a run-time labeling phase may be used to assign attributes to the text being processed by employing inference algorithms. Training may be performed by using the annotated data to create feature vectors for use in various machine learning training processes to create the appropriate models.

Figure 1:
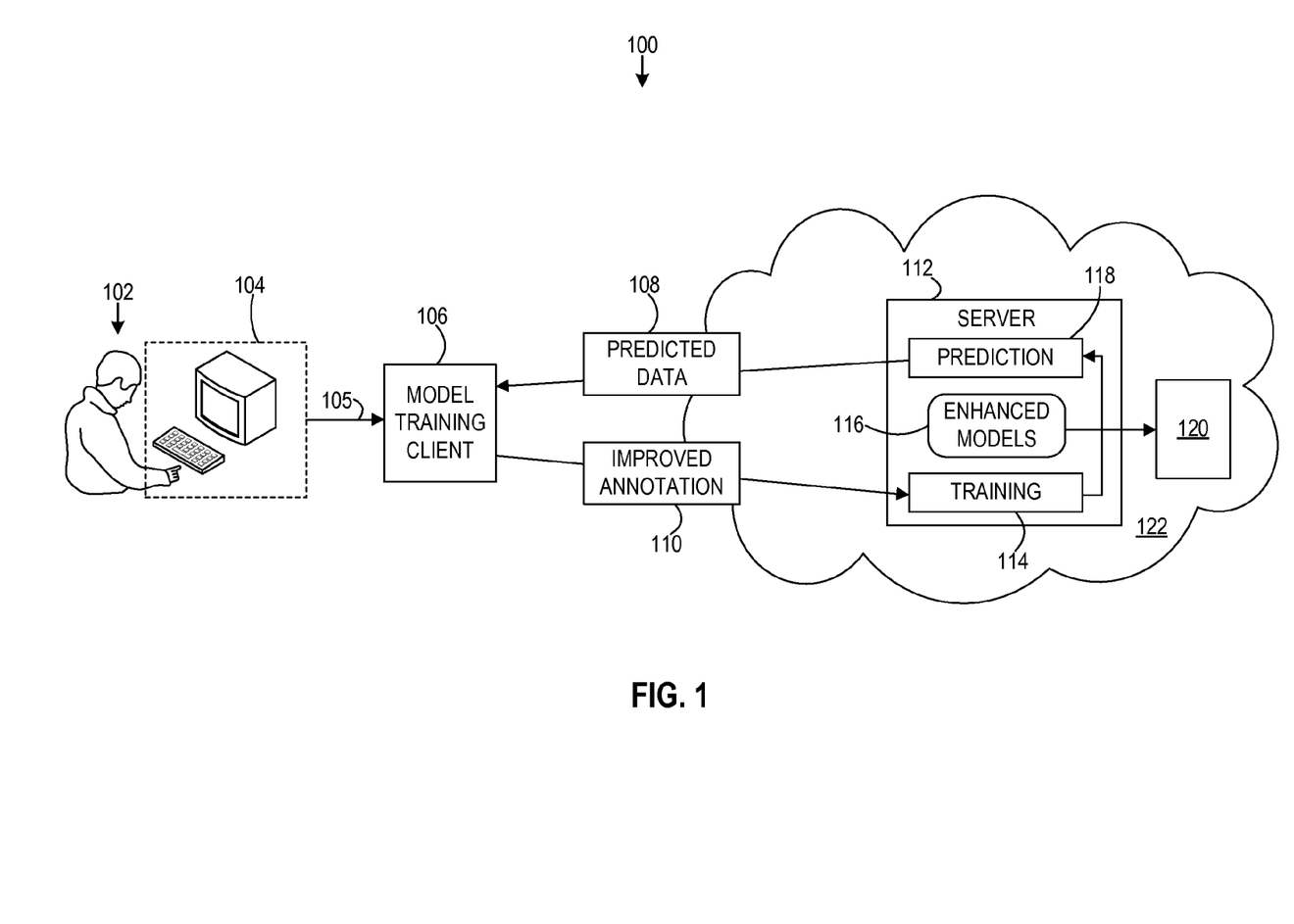
FIG. 1 is a diagram illustrating architecture of a machine learning management system in which one or more embodiments described herein may be implemented.
Figure 5:
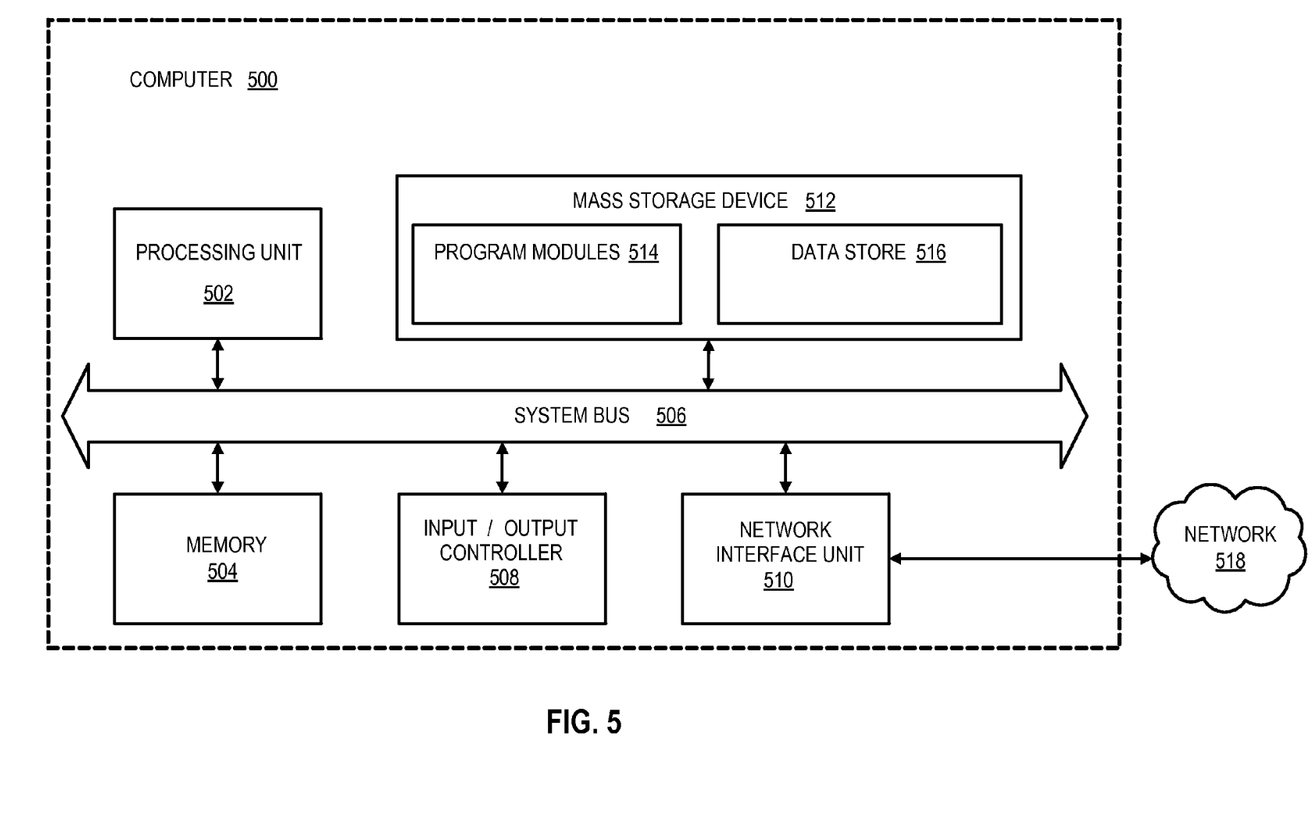
FIG. 5 is a computer architecture diagram showing an illustrative computer hardware architecture for a computing system capable of implementing the embodiments presented herein.

Referring now to the drawings, in which like numerals represent like elements throughout the several figures, aspects of the various implementations provided herein and exemplary operating environments will be described. FIGS. 1 and 5 and the following discussion are intended to provide a brief, general description of suitable computing environments in which the embodiments described herein may be implemented. While the subject matter described herein is presented in the general context of program modules that execute in conjunction with the execution of application modules on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

FIG. 1 is a diagram illustrating architecture of a machine learning management system 100 in which one or more embodiments described herein may be implemented. As shown, the system 100 includes a computer 104 operated by a user 102. By interacting with a user interface running on the computer 104, the user may perform functions for machine learning management through a model training client 106. One or more computer-executable program modules of the model training client 106 may be configured for causing computer 104 and/or server computer 112 to perform specific functions for machine learning management. The model training client 106 may be utilized for training high quality NLP models. Data Annotation Files ("DAF") may be created, which in turn may be used to train models for performing further NLP functions through the use of a training and data management application. The management application may run on a network-based server 112, which as shown includes a computer-executable training module 114 and prediction module 118. Generated models such as enhanced models 116 may be provided to other applications or components (collectively represented by reference numeral 120) for performing various NLP functions at other locations in the network 122.

A user interface executing on the user computer 104 may be configured to function as a management user interface for, in response to receiving user input from a user that include performing specific machine learning management functions such as managing annotations performed by managed computers coupled via a network. Annotation functions may be managed by monitoring the progress of annotations made to text data by the managed computers. Exemplary interface configurations and corresponding functions will be described in further detail with reference to embodiments shown in FIGS. 3 and 4.

By implementing functions described herein in accordance with one or more embodiments, successively more accurate NLP models may be generated using an iterative approach based on a feedback loop formed by improved annotation 110, training 114, prediction 118, and predicted data 108 managed via the model training client 106. A base model may be improved by closing the feedback loop, where the data may include tokenization, POS tagging, chunking, and/or name entity recognition ("NER") annotation. A base model may be used to predict annotations to a first segment of text. Users such as data analysts or linguists may then correct the annotation predictions. The resulting corrected data may then used to train a new model based on just the corrections made to the predictions on the first segment of text. This new model may then be used to predict annotations on a second segment of text. The corrections made to predictions on the second segment of text may then be used to create a new model and predict annotations on a third segment of text, and so on accordingly.

This prediction, annotation, and training feedback loop may progressively improve a model as additional segments of text are processed. For example, a base model may be used to predict annotations on Chapter 1 of a book. Users may then correct the Chapter 1 annotation predictions. The resulting, corrected data may then used to train a new model based on just the corrections made to the predictions on Chapter 1. This new model may then be used to predict annotations on Chapter 2 of the book. The corrections made to predictions from Chapter 2 may then used to create a new model and predict annotations on Chapter 3 of the book. The prediction, annotation, and training process may continue to improve a model after adding further chapters.

As briefly described above, machine learning training according to one or more embodiments described herein may learn the weights of features and persist them in a model such that the inference processes for predictive annotation can use the model for predicting the correct labels to assign to the terms as they are being processed. Models may be trained using annotated files that define the information being identified for the model being created. For example, in an NER process, training files may consist of markup indicating the categories of all the terms in the document. The entity prediction algorithm may then incorporate this information to assign the correct category to each phrase in the data.

Machine learning-based modeling performed according to one or more embodiments described herein may provide a degree of language and domain independence because the same algorithms predict the correct labeling sequences regardless of the selection or computation of feature sets. A new model may easily be created for each new domain, language or feature prediction task by annotating the text with the desired features.

Figure 2:
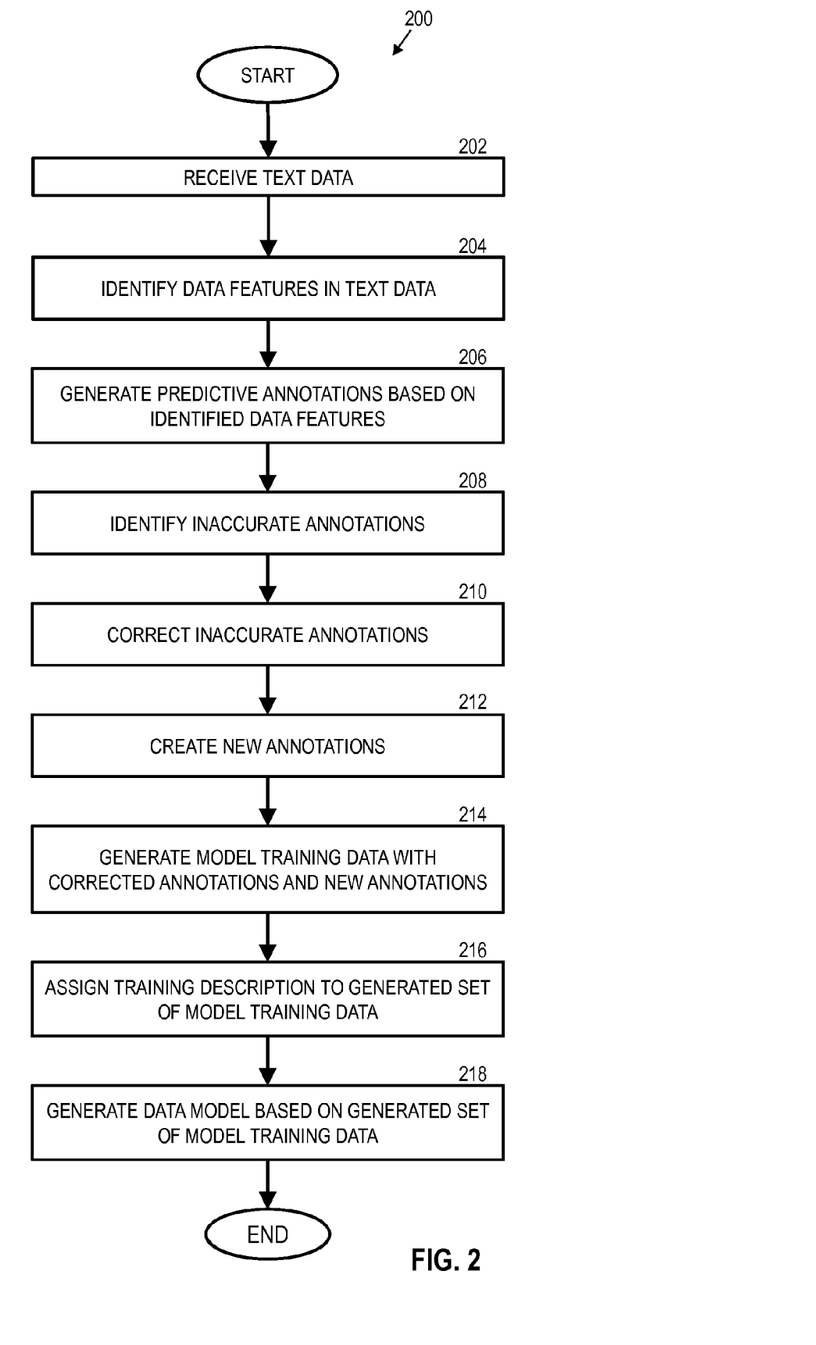
FIG. 2 is a flow diagram illustrating a routine for machine learning management according to one embodiment.

With reference to FIG. 2, an illustrative routine will be described in detail according to one embodiment. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

FIG. 2 illustrates a routine 200 for machine learning management according to one embodiment. The routine 200 begins at operation 202, where a segment of text data is received. Receiving the text data may include retrieving annotation data from an annotation file having one or more sets of previously annotated training data and/or previously created data models. Next, at operation 204, data features corresponding to a sequence of characters in the segment of text data are identified. The sequence of characters may be selected from within the segment of text data in response to a user selection via a user interface. From operation 204, the routine 200 proceeds to operation 206, where predictive annotations to the sequence of characters are generated based at least in part on the identified data features. Generating the predictive annotations may include predictively labeling factual assertions, parts of speech, syntactic roles, token boundaries, and/or categories associated with the sequence of characters. Predictive labeling may be based on resource data that includes lexicons identifying predefined associations between particular sequences of characters and labels. From operation 206, the routine 200 proceeds to operation 208, where inaccurate annotations generated according to the predictive annotations are identified.

The routine 200 proceeds from operation 208 to operation 210, where the identified inaccurate annotations are corrected. Operations 208 and 210 may include inspecting and/or validating annotations generated according to the predictive annotations. Inspection may be performed in response to receiving a user selection of one or more types of annotations to review. Following operation 210, at operation 212 one or more new annotations may be created, i.e. annotations that were not generated by predictive annotation. Various types of annotations may be created in association with one or more particular sequences of characters, for example sentences, phrases, tokens, co-references, facts, and/or notes. Identified data features may have assigned weights, and the predictive annotations may be generated based on the assigned weights.

From operation 212, the routine 200 proceeds to operation 214, where one or more sets of model training data are generated. The sets of model training data incorporate the corrected annotations and newly created annotations. The routine 200 proceeds from operation 214 to operation 216, where a training descriptor is assigned to the generated set of model training data. The routine 200 proceeds from operation 216 to operation 218, where a data model is generated based on the one or more sets of training data, and further based on one or more other sets of previously annotated training data selected according to a corresponding training descriptor. A user may select a range of available files to use as training data. The routine 200 ends following operation 218.

According to one or more embodiments, the training descriptor may include a version history identifier that may have arbitrary labels applied by the user. For example, stored files with training data, source text, or data annotation can be tagged to identify annotations that have been made at specific points over time, and also to identify specific users that made the annotations. A training descriptor can be archived in multiple storage locations for enabling the a user to recreate a particular training process at a future time. That is, the user may pick up from a specific point in time to make customizations based on a previous training process. The corresponding data may then be resubmitted or used to perform an exact retrain, meaning a resubmission of the training descriptor previously used.

Training data sets, text data files, generated data models, various resource data, or other machine learning related data may be tagged such that a user is able to easily filter training data by any labels they wish to apply. User-defined tags may be particularly useful to allow a team of users to track the progress of iterations throughout the various machine learning processes that specific users may employ. As one example, a manager may be enabled to see when a first user and second user both complete annotations to respective documents, or the manager may selectively view all files that the first user has finished annotating and to view all files the second user is in the process of annotating. Data models, and other various types of training or text data files for performing machine learning management functions described herein may be shared by various users via a network of coupled computers to provide for efficient collaboration. According to one or more embodiments, configurations may allow for training processes to be divided into multiple parts, tasks, and/or particular segments of text to be processed such that aspects of prediction, annotation, and/or training may be performed in parallel on multiple computers via a network-based API.

The following example provides a sample representation of a feature vector focused on parts of speech tagging which may be performed according to one or more embodiments described herein. The vector of features shown in Table 1 can represent the annotation of the sentence: "The court rejected his incredible claims."

TABLE 1

| 0 | NEXT_1=court | W=the | PRE_3=the | PRE_2=th | PRE_1=1 | SUF_3=the | SUF_2=he | SUF_1=e | |
|---|---|---|---|---|---|---|---|---|---|
| 0 | NEXT_1=rejected | W=court | PRE_3=cou | PRE_2=co | PRE_1=c | SUF_3=urt | SUF_2=rt | SUF_1=t | PREV_1=the |
| 0 | NEXT_1=his | W=rejected | PRE_3=rej | PRE_2=re | PRE_1=r | SUF_3=led | SUF_2=ed | SUF_1=d | PREV_1=court |

TABLE 1-continued

| 0 | NEXT_1=incredible | W=his | PRE_3=his | PRE_2=hi | PRE_1=h | SUF_3=his | SUF_2=is | SUF_1=s | PREV_1=rejected |
|---|---|---|---|---|---|---|---|---|---|
| 0 | NEXT_1=claims | W=incredible | PRE_3=inc | PRE_2=in | PRE_1=l | SUF_3=ble | SUF_2=ie | SUF_1=e | PREV_1=his |
| 0 | NEXT_1=, | W=claims | PRE_3=cia | PRE_2=cl | PRE_1=c | SUF_3=ims | SUF_2=ms | SUF_1=s | PREV_1=incredible |
| 0 | TYPE=PUNC= | W=. | PREV_1=claims | | | | | | |

The first column of Table 1 represents the specific part of speech for that term. The features captured for each term can indicate suffixes, prefixes, and other terms adjacent to the current term as shown in this example. Features further away from the current term may also be captured.

A user tagging this sentence might provide POS tags as shown below in Table 2.

TABLE 2

| DT | NEXT_1=court | W=the | PRE_3=the | PRE_2=th | PRE_1=t | SUF_3=the | SUF_2=he | SUF_1=e | |
|---|---|---|---|---|---|---|---|---|---|
| NN | NEXT_1=rejected | W=court | PRE_3=cou | PRE_2=co | PRE_1=c | SUF_3=urt | SUF_2=rt | SUF_1=t | PREV_1=the |
| VBD | NEXT_1=his | W=rejected | PRE_3=rej | PRE_2=re | PRE_1=r | SUF_3=ted | SUF_2=ed | SUF_1=d | PREV_1=court |
| PRP$ | NEXT_1=incredible | W=his | PRE_3=his | PRE_2=hi | PRE_1=h | SUF_3=his | SUF_2=is | SUF_1=s | PREV_1=rejected |
| JJ | NEXT_1=claims | W=incredible | PRE_3=inc | PRE_2=in | PRE_1=i | SUF_3=ble | SUF_2=le | SUF_1=e | PREV_1=his |
| NNS | NEXT_1=, | W=claims | PRE_3=cia | PRE_2=ci | PRE_1=c | SUF_3=ims | SUF_2=ms | SUF_1=s | PREV_1=incredible |
| . | TYPE=PUNC= | W=. | PREV_1=claims | | | | | | |

Figure 3:
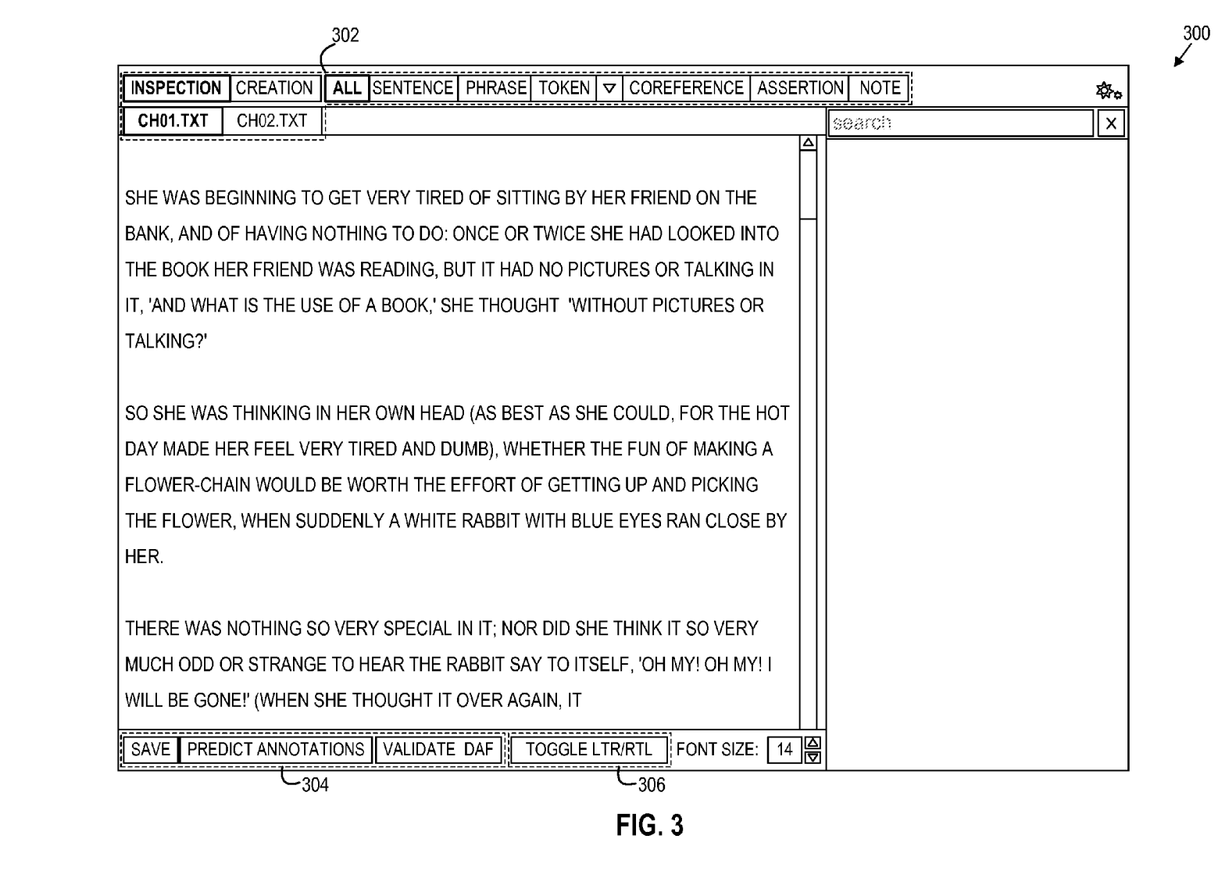
FIGS. 3 and 4 are screen diagrams showing a user interface for machine learning management according to one embodiment.
Figure 4:
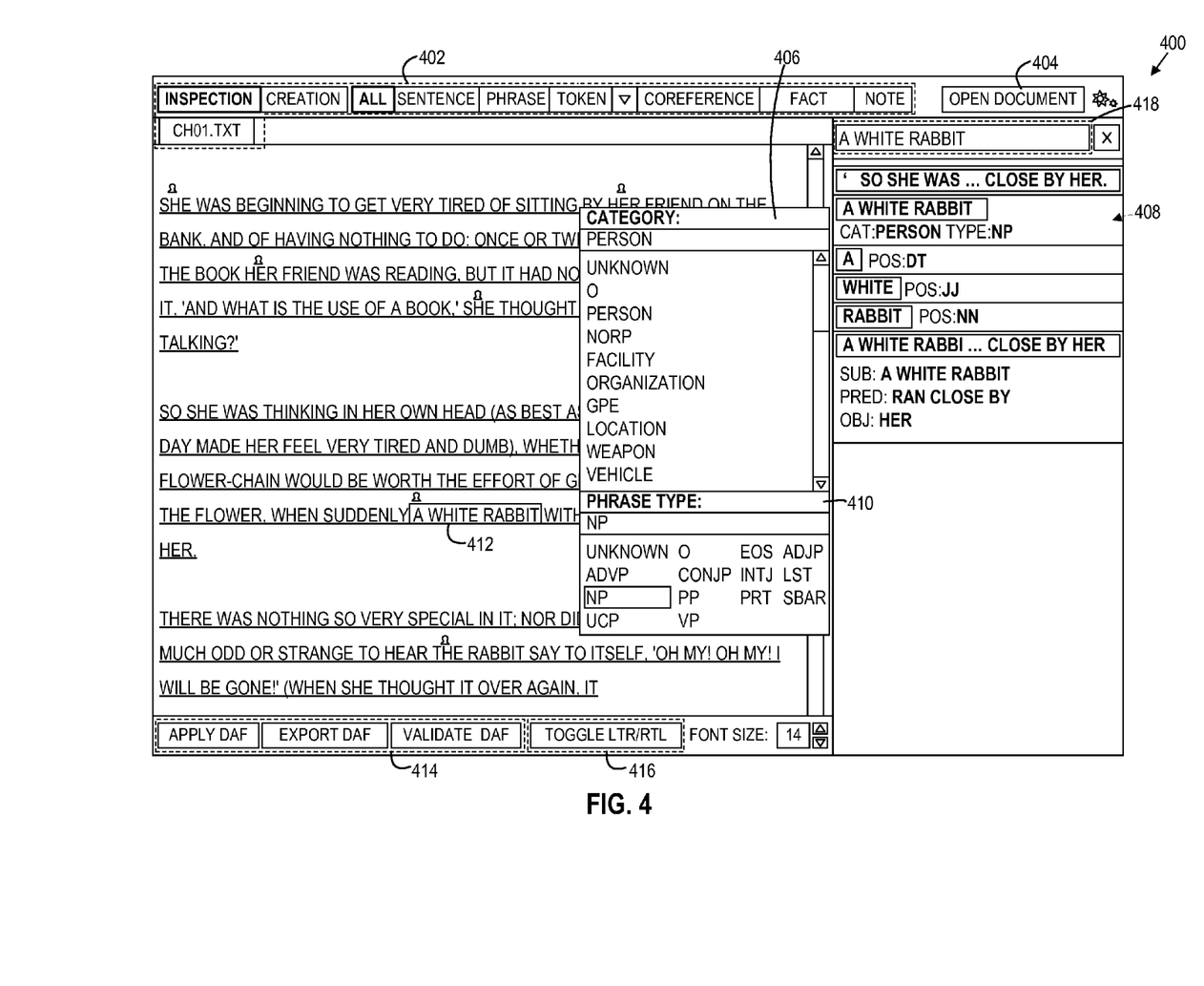

Where:
DT = Determinant
PRP$ = Possessive Pronoun
. = EOS (End of Sentence)
NN = Singular Noun
JJ = Adjective
VBD = Verb Past Tense
NNS = Noun Plural FIGS. 3 and 4 are screen diagrams 300 and 400 of a user interface for machine learning management, according to one embodiment. In particular, an annotation interface configuration is shown. The user interface has numerous input controls configured for interaction with a computer user and, in response to receiving an action by a user, causing one or more computers to perform specific functions for machine learning management. Navigating between an "Inspection" and "Creation" mode, and between text files may be performed by selecting the appropriate mode and text file to inspect or annotate. Accordingly, to navigate to the Inspection mode and a Chapter 1 text file, a user would select the "Inspection" button and then the "ch0 1 .txt" tab, and to navigate to the Creation mode and the Chapter 1 text file, the user would select the "Creation" button and then the "ch0 1 .txt" tab. Similarly, to navigate to the Inspection mode and Chapter 2 text file, a user would select the "Inspection" button and the "ch02.txt" tab, and to navigate to the Creation mode and Chapter 2 text file, a user would select the "Creation" button and "ch02.txt" tab.

Now referring specifically to buttons within the illustrated group 302, "Inspection" enables the inspection mode and "Creation" enables the creation mode with respect to the selected text; "All" enables the inspection and updating of all annotations to the text; "Sentence" enables inspection and updating of sentence annotations when the Inspection mode is active and creation of sentence annotations when the Creation mode is active; "Phrase" enables the inspection and updating of phrase annotations in the Inspection mode and creation of phrase annotations in the Creation mode; "Token" enables the inspection and updating of token annotations in the Inspection mode and the creation of token annotations in the Creation mode; "Coreference" enables the inspection and updating of coreference annotations in the Inspection mode and creation of coreference annotations in the Creation mode; "Assertion" enables the inspection and updating of assertion annotations in the Inspection mode and the creation of assertion annotations in the Creation mode; and "Note" enables the inspection and updating of note annotations in the Inspection mode and the creation of note annotations in the Creation mode. Within the illustrated group of buttons 304 and 306, "Save" enables the saving of open files; "Predict Annotations" enables the predictions of annotations to a selected file; "Validate DAF" enables the validations of the annotations in a selected file; and "Toggle LTR/RTL" enables toggling text alignment in the selected file.

Now referring specifically to the screen diagram 400 of FIG. 4 a user interface includes various input controls 402, 404, 406, 408, 410, 414, 416, and 418. As similarly illustrated in FIG. 3, the screen diagram 400 shows an exemplary segment of text taken from a fictional work of literature, where "Inspection" mode is active and the data annotation mode "All" is selected (see corresponding buttons in grouping 402). As described above with reference to FIG. 3, selecting the All mode displays all annotations of the text selected in the text file.

The exemplary implementation of FIG. 4 relates to an area of special interest when annotating fictional works, namely the treatment of objects or animals as main characters. In many fictional works where objects or animals are characters in the story line, they act and communicate as a person would in a non-fictional work. This treatment is exemplified with regard to the "White Rabbit" of the selected text 412. As shown by the drop-down windows and specific menus 406, 408, and 410, the annotated "Category" of the selected phrase is "Person" because the white rabbit interacts with and communicates with the primary character in the story as a person would. By implementing various processes for annotation described in accordance with one or more embodiments above, DAFs having the annotated text can be created. The DAFs may then be used to train models for performing specific NLP functions, following an iterative process to improve annotation prediction accuracy, which may thereby reduce the need for human interaction in generating accurate training data.

FIG. 5 is a computer architecture diagram showing illustrative computer hardware architecture for a computing system capable of implementing the embodiments presented herein. As an exemplary implementation, a computer 500 may include one or more of the components shown in FIG. 1. For example, the computer 500 may be configured to function as the user computer 104 or the server 112. It may be configured to perform one or more functions associated with embodiments illustrated in FIGS. 2-4. A computer 500 includes a processing unit 502, a system memory 504, and a system bus 506 that couples the memory 504 to the processing unit 502. The computer 500 further includes a mass storage device 512 providing non-volatile storage for the computer 500.

Program modules 514 may be stored therein, which may include the model training client 106, training module 114, and/or prediction module 118 shown in FIG. 1. A data store 516, which may include the element store 116 and/or analytics store 118 shown in FIG. 1. The mass storage device 512 is connected to the processing unit 502 through a mass storage controller (not shown) connected to the bus 506. Although the description of computer-storage media contained herein refers to a mass storage device, such as a hard disk or CD-ROM drive, it should be appreciated by those skilled in the art that computer-storage media can be any available computer storage media that can be accessed by the computer 500.

By way of example, and not limitation, computer-storage media may include volatile and non-volatile, removable and non-removable media implemented in any method or technology for storage of information such as computer-storage instructions, data structures, program modules, or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 518. The computer 500 may connect to the network 518 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices. The bus 506 may enable the processing unit 502 to read code and/or data to/from the mass storage device 512 or other computer-storage media. The computer-storage media may represent apparatus in the form of storage elements that are implemented using any suitable technology, including but not limited to semiconductors, magnetic materials, optics, or the like.

Computer storage media may include volatile and non-volatile, removable and non-removable media implemented in any method or technology for the non-transitory storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer. Computer storage media does not include transitory signals.

The program modules 514 may include software instructions that, when loaded into the processing unit 502 and executed, cause the computer 500 to provide functions for co-reference resolution. The program modules 514 may also provide various tools or techniques by which the computer 500 may participate within the overall systems or operating environments using the components, flows, and data structures discussed throughout this description. In general, the program module 514 may, when loaded into the processing unit 502 and executed, transform the processing unit 502 and the overall computer 500 from a general-purpose computing system into a special-purpose computing system. The processing unit 502 may be constructed from any number of transistors or other discrete circuit elements, which may individually or collectively assume any number of states. More specifically, the processing unit 502 may operate as a finite-state machine, in response to executable instructions contained within the program modules 514. These computer-executable instructions may transform the processing unit 502 by specifying how the processing unit 502 transitions between states, thereby transforming the transistors or other discrete hardware elements constituting the processing unit 502.

Encoding the program modules 514 may also transform the physical structure of the computer-storage media. The specific transformation of physical structure may depend on various factors, in different implementations of this description. Examples of such factors may include, but are not limited to: the technology used to implement the computer-storage media, whether the computer storage media are characterized as primary or secondary storage, and the like. For example, if the computer-storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Although the embodiments described herein have been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method, comprising:
receiving a first segment of text data,
identifying data features corresponding to a sequence of characters in the first segment of text data,
generating predictive annotations to the sequence of characters based at least in part on the identified data features,
identifying inaccurate annotations generated according to the predictive annotations,
correcting the identified inaccurate annotations,
generating at least one set of model training data incorporating the corrected annotations, and
monitoring progress of annotations made to a second segment of text data associated with the first segment of text data by a plurality of collaborating users of a plurality of managed computers, the monitoring including determining, based at least in part on a training descriptor corresponding to the second segment of text data, a state of completion of annotations made to the second segment of text data by a particular one of the plurality of collaborating users, wherein the training descriptor identifies types of annotations in the at least one set of model training data.

2. The method of claim 1, wherein at least one of receiving the first segment of text data, identifying the data features, generating the predictive annotations, identifying the inaccurate annotations, correcting the identified inaccurate annotations, generating the at least one set of model training data, and monitoring the progress of annotations is performed in response to receiving user input data that is received from a user via a user interface that is operatively coupled to the processing unit.

3. The method of claim 1, wherein the state of completion of annotations made to the second segment of text data by the particular one of the plurality of collaborating users includes a state of incomplete, in-process annotation.

4. The method of claim 1, wherein the training descriptor further identifies resource data corresponding to the at least one set of model training data, the resource data comprising a lexicon of associations between predefined sequences of characters and predefined labels.

5. The method of claim 1, wherein the types of annotations identified by the training descriptor comprise at least one of categories and parts of speech associated with the sequence of characters.

6. The method of claim 1, wherein the training descriptor further identifies types of features in the identified data features and a relative weight assigned to each of the types of features in the identified data features.

7. The method of claim 1, further comprising assigning the training descriptor to the generated set of model training data.

8. The method of claim 1, wherein receiving the first segment of text data comprises receiving annotation data from an annotation file comprising at least one of a set of previously annotated model training data and a generated data model.

9. The method of claim 1, further comprising generating at least one data model based on the at least one set of model training data and further based on at least one other set of previously annotated model training data selected according to a corresponding training descriptor.

10. The method of claim 1, further comprising identifying weights assigned to the identified data features, and wherein predictively annotating the sequence of characters is performed based on the identified weights.

11. A system, comprising:
a processing unit;
a memory operatively coupled to the processing unit; and
a program module which executes in the processing unit from the memory and which, when executed by the processing unit, causes the system to perform machine learning management functions that include:
receiving a first segment of text data,
identifying data features corresponding to a sequence of characters in the first segment of text data,
generating predictive annotations to the sequence of characters based at least in part on the identified data features,
identifying inaccurate annotations generated according to the predictive annotations,
correcting the identified inaccurate annotations,
generating at least one set of model training data incorporating the corrected annotations, and
monitoring progress of annotations made to a second segment of text data associated with the first segment of text data by a plurality of collaborating users of a plurality of managed computers, the monitoring including determining, based at least in part on a training descriptor corresponding to the second segment of text data, a state of completion of annotations made to the second segment of text data by a particular one of the plurality of collaborating users, wherein the training descriptor identifies types of annotations in the at least one set of model training data.

12. The system of claim 11, wherein at least one of the machine learning management functions is performed in response to receiving user input data that is received from a user via a user interface that is operatively coupled to the processing unit.

13. The system of claim 11, wherein the state of completion of annotations made to the second segment of text data by the particular one of the plurality of collaborating users includes a state of incomplete, in-process annotation.

14. The system of claim 11, wherein the training descriptor further identifies resource data corresponding to the at least one set of model training data, the resource data comprising a lexicon of associations between predefined sequences of characters and predefined labels.

15. The system of claim 11, wherein the types of annotations identified by the training descriptor comprise at least one of categories and parts of speech associated with the sequence of characters.

16. The system of claim 11, wherein the training descriptor further identifies types of features in the identified data features and a relative weight assigned to each of the types of features in the identified data features.

17. The system of claim 11, wherein the machine learning management functions further include assigning the training descriptor to the generated set of model training data.

18. The system of claim 11, wherein receiving the first segment of text data comprises receiving annotation data from an annotation file comprising at least one of a set of previously annotated model training data and a generated data model.

19. The system of claim 11, wherein the machine learning management functions further include generating at least one data model based on the at least one set of model training data and further based on at least one other set of previously annotated model training data selected according to a corresponding training descriptor.

20. The system of claim 11, wherein the machine learning management functions further include identifying weights assigned to the identified data features, and wherein predictively annotating the sequence of characters is performed based on the identified weights.

21. A non-transitory computer-readable storage medium having computer-executable instructions stored thereon which, when executed by a processing unit, cause a computer to perform machine learning management functions that include:

receiving a first segment of text data, identifying data features corresponding to a sequence of characters in the first segment of text data, generating predictive annotations to the sequence of characters based at least in part on the identified data features, identifying inaccurate annotations generated according to the predictive annotations, correcting the identified inaccurate annotations, generating at least one set of model training data incorporating the corrected annotations, and monitoring progress of annotations made to a second segment of text data associated with the first segment of text data by a plurality of collaborating users of a plurality of managed computers, the monitoring including determining, based at least in part on a training descriptor corresponding to the second segment of text data, a state of completion of annotations made to the second segment of text data by a particular one of the plurality of collaborating users, wherein the training descriptor identifies types of annotations in the at least one set of model training data.

22. The computer-readable storage medium of claim 21, wherein at least one of the machine learning management functions is performed in response to receiving user input data that is received from a user via a user interface that is operatively coupled to the processing unit.

23. The computer-readable storage medium of claim 21, wherein the state of completion of annotations made to the second segment of text data by the particular one of the plurality of collaborating users includes a state of incomplete, in-process annotation.

24. The computer-readable storage medium of claim 21, wherein the training descriptor further identifies resource data corresponding to the at least one set of model training data, the resource data comprising a lexicon of associations between predefined sequences of characters and predefined labels.

25. The computer-readable storage medium of claim 21, wherein the types of annotations identified by the training descriptor comprise at least one of categories and parts of speech associated with the sequence of characters.

26. The computer-readable storage medium of claim 21, wherein the training descriptor further identifies types of features in the identified data features and a relative weight assigned to each of the types of features in the identified data features.

27. The computer-readable storage medium of claim 21, wherein the machine learning management functions further include assigning the training descriptor to the generated set of model training data.

28. The computer-readable storage medium of claim 21, wherein receiving the first segment of text data comprises receiving annotation data from an annotation file comprising at least one of a set of previously annotated model training data and a generated data model.

29. The computer-readable storage medium of claim 21, wherein the machine learning management functions further include generating at least one data model based on the at least one set of model training data and further based on at least one other set of previously annotated model training data selected according to a corresponding training descriptor.

30. The computer-readable storage medium of claim 21, wherein the machine learning management functions further include identifying weights assigned to the identified data features, and wherein predictively annotating the sequence of characters is performed based on the identified weights.

* * * * *